Figure 1:
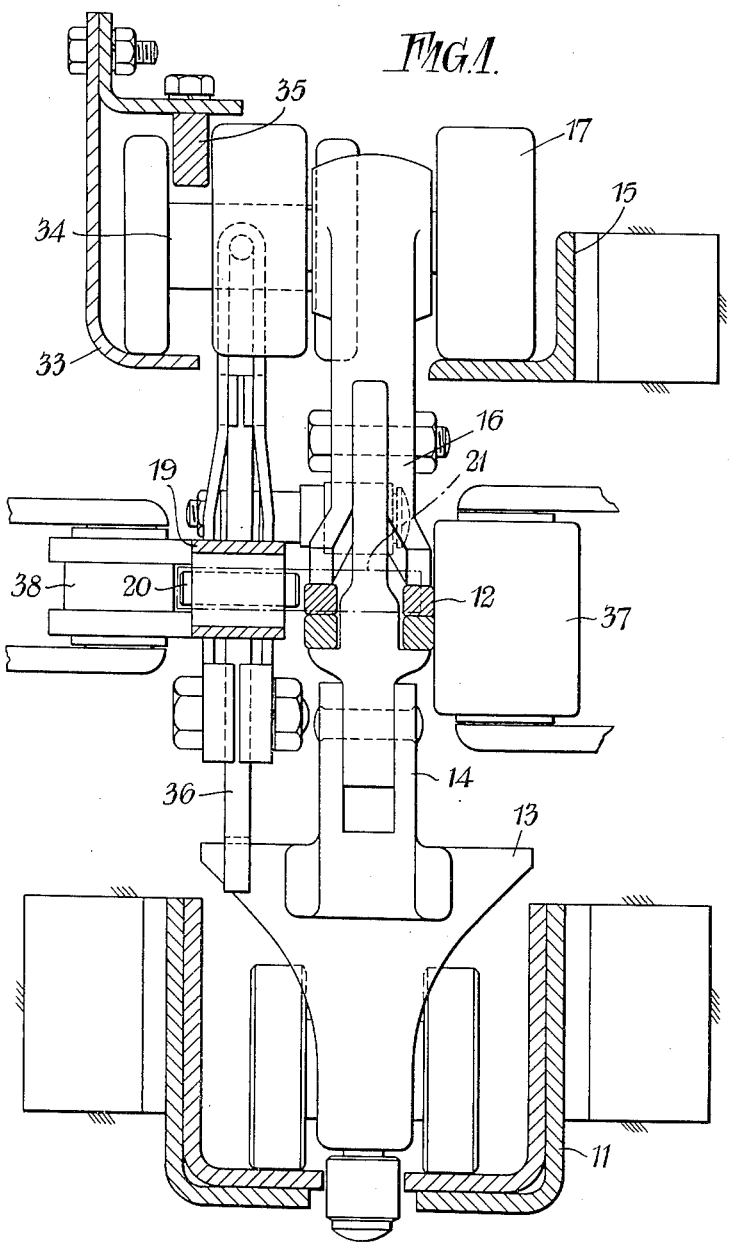

Oct. 2, 1962 A. T. C. BURROWS 3,056,486
CONVEYOR SYSTEMS
Filed April 5, 1960 3 Sheets-Sheet 1

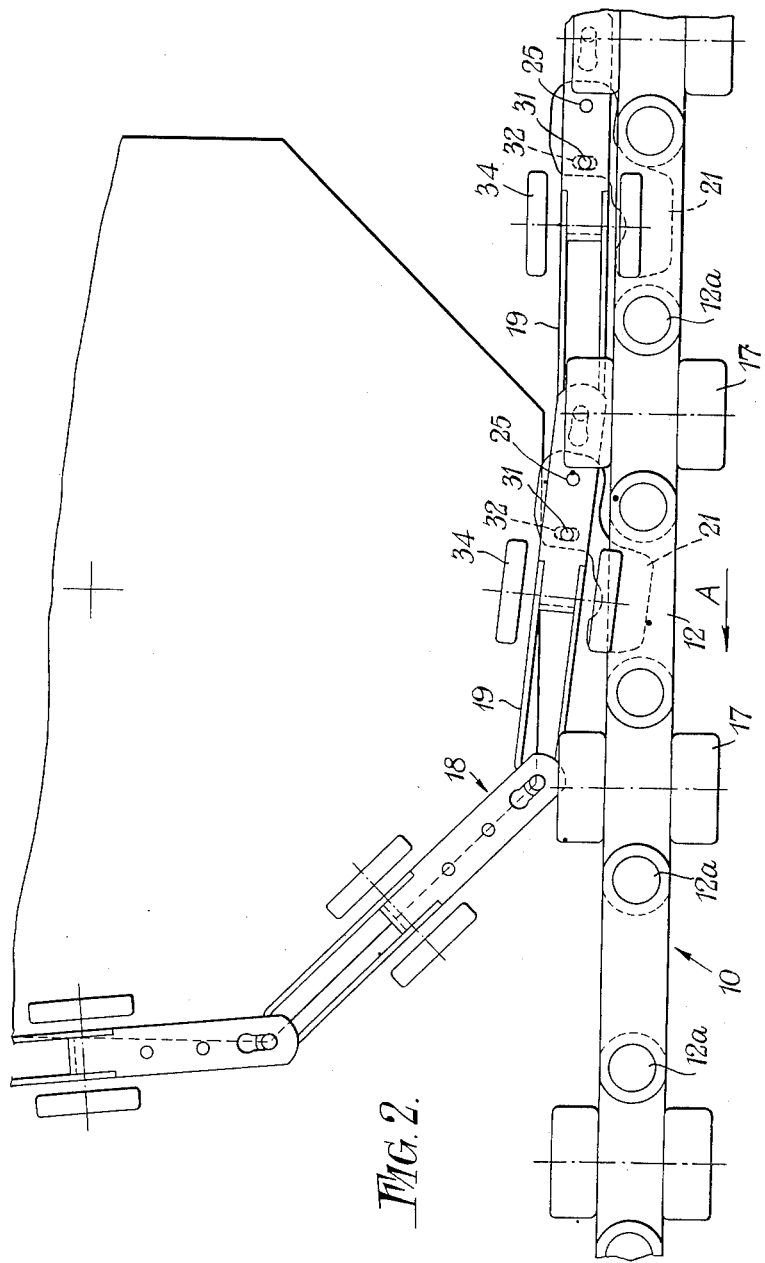

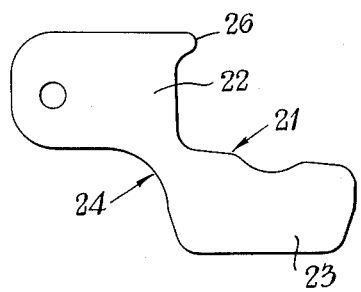
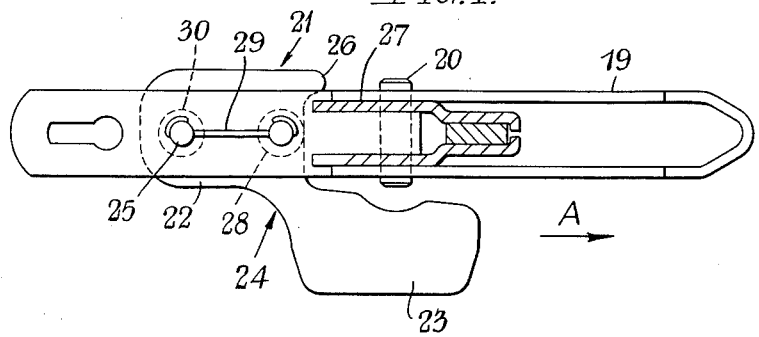

3,056,486
CONVEYOR SYSTEMS
Arthur Thomas Charles Burrows, Stevenage, England, assignor to Geo. W. King Limited, Stevenage, England, a British company
Filed Apr. 5, 1960, Ser. No. 20,167
Claims priority, application Great Britain Apr. 10, 1959
6 Claims. (Cl. 198—203)

This invention relates to conveyor systems of the kind wherein load carrying trolleys are propelled along a fixed track by reason of the engagement therewith of pusher dogs or abutments which depend from a driven chain travelling along a path above the fixed track.

According to the present invention it is proposed to arrange two conveyors of the kind indicated wherein for a preselected portion of their length the two chains will be disposed in side by side relationship. One of the chains is provided with laterally projecting tooth like elements which are spaced along the length thereof and are adapted to mesh or engage with the other chain so that with a drive imparted to one of the chains a drive will be transmitted therefrom to the other chain. Preferably the chain provided with the tooth like elements will be driven by the other chain. Moreover, the toothlike elements are preferably mounted on the chain as to be capable of limited pivotal movement relatively thereto. Preferably also the arrangement of the conveyors is such that in the region of the drive transmitting zone load, trolleys may be effectively transferred from one conveyor to the other.

In order that the said invention may be clearly understood and readily carried into effect the same will be hereinafter more fully described with reference to the accompanying drawings in which:

FIGURE 1 is a cross sectional view showing two conveyors in side by side relationship as they will be when in a zone wherein a drive is imparted from the chain of one conveyor to that of the other, FIGURE 2 is a diagrammatic plan view of a part of the drive transmitting zone, FIGURE 3 is a side elevational view of a tooth like element adapted to be applied to one of the conveyor chains, FIGURE 4 is a detail view showing the element of FIGURE 3 in position in a chain link.

Referring now to the drawings 10 generally denotes a first or main conveyor which is of the kind wherein load carrying trolleys are propelled along a fixed track 11 by virtue of the engagement therewith of pusher dogs or driving abutments which depend from an endless driven chain 12. In FIGURE 1 one of the load trolleys is indicated at 13 while 14 denotes a pusher dog or abutment. The chain which is caused to travel along a path above the path of travel of the load trolleys is supported at spaced points along its length by means of hangers or the like which depend from trolleys, hereinafter termed chain trolleys which run in or on a second fixed track 15 disposed vertically above the first mentioned track on which the load trolleys are supported. In FIGURE 1, 16 denotes a hanger which is suspended from a chain trolley 17. Also depending from the chain at spaced points along its length is a plurality of so-called retainer dogs, the arrangement being such that pusher dogs or driving abutments and retainer dogs will be arranged alternately along the length of the chain 12. A conveyor of the kind briefly indicated above is well known and will not be further described herein. The endless driving chain 12 employed in the main conveyor will be of known type comprising a succession of substantially flat so-called inner and outer links which are interconnected by connecting pins 12a, the axes of such pins extending vertically when the chain is extended along a horizontal path.

In addition to the main conveyor a second conveyor designated generally by 18, FIGURE 2, is provided which although generally of the same type as said main conveyor is preferably of lighter construction. The driving chain 19 of the second conveyor is, as will be apparent from FIGURES 2 and 4 made up of a succession of links made from metal strip and bent to a U or substantially U shape such links being interconnected by means of connecting pins 20. Such chains are also generally of known construction.

In the embodiment illustrated the arrangement is such that the chain of the second conveyor 18 will be driven from that of the first conveyor 10 and to this end the two conveyors are relatively so arranged that for a predetermined distance the respective chains 12 and 19 will be caused to travel in close side by side relationship and at the same level. To obtain the necessary drive from one chain to the other, each alternate link of the chain of the second conveyor 18 is provided with a laterally projecting tooth element 21 which is adapted as the chains are brought into side by side relationship to project into the space between the two link elements forming an outer link of the chain 12 of the main conveyor and to be engaged by the connecting pins 12a serving to connect said outer link to the adjoining inner link of said main conveyor chain 12. The arrangement of the chains will preferably be such that in the drive transmitting zone i.e. where the two chains are running closely together in side by side relationship a plurality of tooth elements 21 on the second chain 19 will be in mesh with the first or main chain 12. It will be appreciated of course that the pitch of the main chain (i.e. the spacing of the connecting pins 12a and the size and disposition of the outer links) and the pitch of the tooth elements 21 on the second chain 19 will have to be chosen so that said elements will move smoothly into mesh with the main chain as the two chains approach each other. The arrangement will be such that the laterally projecting tooth elements 21 will be mounted on those links of the second chain 19 the limbs of which are disposed in horizotnal planes when said second chain is extended horizontally. As indicated above and illustrated in FIGURES 2 and 4 the links of the second chain 19 comprise metal strips bent to a U or substantially U shape, the arrangement being such that the limbs of the alternate links will be disposed in horizontal planes while the limbs of the intervening links will be disposed in vertical planes. Referring now particularly to FIGURES 3 and 4 it will be seen that each tooth element 21 comprises a flat plate like portion 22 adapted to be introduced between the limbs of the link to which it is to be attached and a second or toe like portion 23 which is formed integrally with said first mentioned portion and is adapted to project laterally from the chain, such second or toe like portion 23 when the tooth element is viewed in plan being offset with respect to the first mentioned portion and projecting forwardly thereof in the direction of travel of the chain, which in FIGURES 2 and 4 is indicated by the arrow A. The rear end of the second or toe like portion 23 of each tooth element is suitably profiled as indicated at 24 so that it may be effectively engaged by a connecting pin 12a on the driving chain 12 of the main conveyor. Each tooth element 21 is pivotally connected to its respective link by means of a pin 25 but the arrangement will be such that the degree of pivotal movement relatively to the link will be limited. To this end each tooth element 21 is formed with a nose or projection 26 which is adapted on assembly of the chain, as will be apparent from FIGURE 4, to cooperate with a member 27 forming part of a hanger attachment by which the chain is suspended from one of its supporting trolleys. As will be appreciated from FIGURE 4 the tooth element 21 will only be capable of limited pivotal movement about the pin 25. In order to center the tooth element with respect to the limbs of the link and to prevent any tendency to undesired lateral movement or wobbling of said element about its pin 25, suitable pads, studs, or the like, such as are indicated at 28, will be introduced into additional apertures formed in the limbs of the chain link such pads or the like being secured in position by means of wire clips or the like 29. Suitable washers or packers indicated at 30 will be located on the pin 25 in order to center the tooth element relative to the limb. In a further embodiment the link is provided with a second pin spaced appropriately from the pivot pin and adapted to project through a slot in the first mentioned portion of the tooth element which is disposed between the limbs of the link. Such alternative arrangement is indicated in FIGURE 2 wherein 31 denotes the second pin and 32 the slot.

By virtue of the fact that the chains 12 and 19 of the main and second conveyors are disposed closely together while in the region of the drive transmitting zone it will be necessary in order to allow passage or free travel of the chain trolleys serving to support the chain 19 of the second conveyor, to cut away an appropriate section of the chain trolley track of each conveyor. That is clearly illustrated in FIGURE 1 wherein the single angle member designated at 15 constitutes the chain trolley track of the main conveyor while 33 denotes the chain trolley track member of the second conveyor. As will be seen from FIGURES 1 and 2 the arrangement of the conveyors is such that in the drive transmitting zone the chain trolleys 34 serving to support the chain 19 of the second conveyor will alternate with the chain trolleys 17 serving to support the chain 12 of the main conveyor and when viewed in end elevation as in FIGURE 1 the two sets of trolleys will be in partially overlapping relation. Thus in the region of the drive zone the chain trolleys 17, 34 of the main and second conveyors will only be supported at one side e. g. as shown in FIGURE 1, the left hand wheel only of each chain trolley of the second conveyor will be supported on the track or running surface 33 while the right hand wheel only of each chain trolley of the main conveyor will be supported on the fixed track or running surface 15. In veiw of the fact that each of the chain trolleys will only be supported at one side while in the region of the drive zone it may be found desirable to provide means for preventing any undesirable lateral tilting of the chain trolleys and such means may for example comprise one or more fixed skid plates or the like such as indicated at 35 adapted to cooperate with the upper parts of the trolley wheels.

The arrangement is preferably such that as each depending driving dog or abutment on the second chain moves into and along the drive transmitting zone it will be positioned to engage the load trolley present in the aforesaid zone on the track of the main conveyor. Such a condition is illustrated in FIGURE 1 wherein 36 denotes a driving dog on the second conveyor. Thus by providing suitable switch points in the main conveyor track 11 it will be possible to arrange for load trolleys to be transferred from the main conveyor to the second conveyor and vice versa in the region of the drive transmitting zone. By appropriate arrangement of the respective chains 12, 19 in the drive transmitting zone it will be possible to arrange for the transfer of load trolleys from one conveyor to the other without the track of the main conveyor deviating from a straight line.

In the region of the drive transmitting zone it may be found desirable to provide appropriately arranged fixed guides adapted to cooperate with either or both chains in order to prevent any tendency to undesired lateral displacement thereof as they approach or are in driving engagement with each other. In the embodiment illustrated in FIGURE 1 such guides in the form of freely rotatable rollers are indicated at 37 and 38.

Preferably only one secondary or driven chain will be arranged to engage the main conveyor chain at a selected drive transmitting zone i.e. two driven chains will not normally be disposed in opposite sides of the main chain opposite to each other. Such an arrangement would however be possible but it would be necessary either to reduce the penetration of the laterally projecting tooth elements 21 on the driven chain or alternatively to double the pitch of said tooth elements so that the elements of the two driven chains would alternate on the main chain 12. In addition if two driven chains were disposed opposite each other on opposite sides of the conveyor it would be necessary to introduce three way switches on the load trolley track if it were required to be able to transfer load trolleys to and from either of the secondary conveyors.

What is claimed is:

1. A conveyor system comprising first and second trolleys, a chain supported by each of said trolleys, a track for each trolley, said trolleys being movably supported in their respective tracks, the tracks including straight portions which are at least in part in parallel and adjacent relationship, means coupled to one of said chains to drive the same, laterally extending tooth-like elements supported in spaced relation along the other said chain, said tooth-like elements intermeshing with said one chain to couple said chains in driving relationship, said one chain comprising alternating inner and outer links along the length thereof, a pin connecting adjacent links of said one chain, said other chain comprising U-shaped links in alternating arrangement, and a pin connecting adjacent U-shaped links, each of said tooth-like elements being supported by one of the alternating U-shaped links, each said tooth-like element engaging one of said pins connecting adjacent links of said one chain whereby said chains are coupled in driving relation.

2. A system as claimed in claim 1 wherein said outer links include parallel flat plates defining a space in which said tooth-like element is accommodated.

3. A conveyor system as claimed in claim 1 wherein each of said trolleys includes a pair of wheels, one of said wheels being unsupported with said chains engaged in driving relation, the system further comprising guide means to prevent lateral movement of the chains relative to each other.

4. A conveyor system as claimed in claim 1 wherein said chains have the same pitch.

5. A conveyor system as claimed in claim 3 comprising means operatively associated with the wheels of the trolleys to prevent lateral tilting thereof with the chains engaged in driving relation.

6. A conveyor system as claimed in claim 3 wherein the means to prevent lateral tilting comprises a stationary skid plate.

References Cited in the file of this patent
UNITED STATES PATENTS

| | | |
|---|---|---|
| 2,759,595 | Lauenstein | Aug. 21, 1956 |
| 2,796,975 | Da Costa | June 25, 1957 |
| 2,868,139 | Klamp | Jan. 13, 1959 |